United States Patent Office 3,408,406
Patented Oct. 29, 1968

3,408,406
CAROTENOID COMPOUNDS
Albert J. Chechak and Charles D. Robeson, Rochester, N.Y., assignors to Eastman Kodak Company, Rochester, N.Y., a corporation of New Jersey
No Drawing. Filed Mar. 23, 1966, Ser. No. 536,655
3 Claims. (Cl. 260—612)

ABSTRACT OF THE DISCLOSURE

Novel carotenoid compounds useful as food colorants and as additives in poultry feed are:

1,20-bis(2,6,6-trimethylcyclohex-1-enyl)-3,7,14,18-tetramethyleicos-1,3,5,7,9,11,13,15,17,19-decaene
1-(2,6,6-trimethylcyclohex-1-enyl)-18-(p-methoxyphenyl)-3,7,12,16-tetramethyloctadec-1,3,5,7,9,11,13, 15,17-nonaene, and
1,18-bis(p-methoxyphenyl)-3,7,12,16-tetramethyloctadec-1,3,5,7,9,11,13,15,17-nonaene.

---

This invention resides in the chemical arts. More particularly it relates to that part of organic chemistry having to do with carotenoid compounds.

Carotenoid compounds are organic compounds of aliphatic molecular structure and of aliphatic-alicyclic molecular structure, which structures contain partly dehydrogenated isoprene groups (from 3 or 4 to 8 or more). These groups are present in a chain in such a way that the alternate single and double bonds (conjugated double bonds) form a chromophoric system.

There is a need for edible food colorants suitable for coloring margarine, butter, cheese, fruit juice, soft drinks, candy and other foods.

An object of this invention is to provide new carotenoid compounds which are useful as food colorants.

This and other objects as may appear hereinafter are achieved by this invention.

In summary, this invention comprises a group of new carotenoid compounds. This group consists of 1,20-bis(2,6,6-trimethylcyclohex-1-enyl)-3,7,14,18-tetramethyleicos-1,3,5,7,9,11,13,15,17,19-decaene
1-(2,6,6-trimethylcyclohex-1-enyl)-18-(p-methoxyphenyl)-3,7,12,16-tetramethyloctadec-1,3,5,7,9,11,13, 15,17-nonaene
1,18-bis(p-methoxyphenyl)-3,7,12,16-tetramethyloctadec-1,3,5,7,9,11,13,15,17-nonaene The compounds of this invention, when added to chicken feed free of skin and egg yolk pigmenters, cause the skin and fat of chickens ingesting the feed to have a yellowish tint and the yolks of their eggs to become yellow. In addition, the compounds of this invention are useful as food colorants.

The compounds of this invention generally are synthesized by coupling together by the Wittig reaction appropriate intermediates which are either commercially available or made by known reactions and procedures from commercially available chemicals.

This invention is further illustrated by the following working examples of various aspects of this invention, including preferred specific embodiments thereof. This invention is not limited to these specific embodiments unless otherwise indicated.

In these examples typical quantities and light absorption data are given parenthetically.

Example 1

This example illustrates a specific embodiment of a process for preparing 1,20-bis(2,6,6-trimethylcyclohex-1-enyl)-3,7,14,18-tetramethyleicos-1,3,5,7,9,11,13,15,17,19-decaene.

Carboxymethylenetriphenylphosphonium bromide (47.3 grams) dissolved in ethanol (130 milliliters) is added at $-10°$ C. to sodium (2.3 grams) in ethanol (100 milliliters). The solution is stirred for 5 minutes and retinal (28.5 grams) dissolved in ethanol (110 milliliters) is added. The slurry which forms is allowed to stand for 18 hours at 20–25° C. and the ethanol solvent is then removed by evaporation. The residue is admixed with diethyl ether (100 milliliters), the solids are removed by filtration and the filtrate is washed with 10% sulphuric acid, sodium bicarbonate and water. The washed filtrate is dried over anhydrous sodium sulfate and the ether removed by evaporation. The residue, a syrup is dissolved in petroleum ether (B.P. 35–65° C.) solvent and chromatographed (Doucil column) to give a $C_{22}$ acid ester product (28.4 grams) [E(1%, 1 cm., ethanol)(387 m$\mu$)=1284].

A quantity (20 grams) of the $C_{22}$ acid ester product is dissolved in anhydrous diethyl ether (400 milliliters) and the solution cooled to $-15°$ C. Lithium aluminum hydride (80 milliliters of a 0.8 molar solution) is added dropwise over 15 minutes to the solution while keeping the temperature at $-15°$ C. After 5 minutes acetone is added to the resulting mixture to destroy excess lithium aluminum hydride and the mixture is washed with dilute sulfuric acid, 3% potassium hydroxide solution and water. The ether solution which remains is dried over sodium sulfate and evaporated. The residue consists essentially of 5,9-dimethyl-11(2,6,6-trimethylcyclohex-1-enyl)-undec-2,4,6, 8,10-pentaene-1-ol, a $C_{22}$ alcohol (17.7 grams) [E(1%, 1 cm., ethanol)(355 m$\mu$)=910].

A quantity (4.0 grams) of the $C_{22}$ alcohol is dissolved in methanol (13.5 milliliters). Triphenylphosphine (3.35 grams) and 2 N methanolic hydrogen chloride (6.5 milliliters) are added and the solution stirred at 20–25° C. overnight. A 5 milliliter aliquot portion of the resulting solution is cooled to $-10°$ C., and 2 N methanolic potassium hydroxide (1.7 milliliters) and retinal (0.91 gram) in methanol (4 milliliters) are added to it. The resulting mixture is allowed to warm to 20–25° C. and after 18 hours the solids are filtered off, washed with methanol, water and methanol and then recrystallized from chloroform to give the desired product (0.37 gram) [E(1%, 1 cm., cyclohexane)(478 m$\mu$)=2160]. It consists essentially of 1,20-bis(2,6,6-trimethylcyclohex-1 - enyl) - 3,7,14,18-tetramethyleicos-1,3,5,7,9,11,13,15,17,19-decaene.

Example 2

This example illustrates a specific embodiment of a process for the synthesis of 1-(2,6,6-trimethylcyclohex-1-enyl)-18-(p-methoxyphenyl)-3,7,12,16-tetramethyloctadec - 1,3, 5,7,9,11,13,15,17-nonaene.

5-(p-methoxyphenyl) - 3-methylpenta-2,4-dienoic acid [E(1%, 1 cm., cyclohexane) (329 m$\mu$)=1220] is made from anisaldehyde by the process of Cawley and Nelan [JACS 77, 4130, (1955)]. The acid (79 grams) is esterified by refluxing with methyl iodide (50 milliliters) in 2-butanone (500 milliliters) in the presence of anhydrous potassium carbonate (60 grams) for 1.5 hours. After diluting the reaction mixture with ether and water, the layers are separated and the ether layer washed with water. After drying the ether layer over sodium sulfate, it is filtered, and the solvent distilled off to yield a solid residue consisting essentially of the methyl ester (72.5 grams). Crystallization of the residue from methanol (250 milliliters) gives crystals (60 grams) [E(1%, 1 cm., cyclohexane) (333 m$\mu$)=1231] of the methyl ester.

A portion (66 grams) of the ester in anhydrous ethyl ether (950 milliliters) is cooled to $-5°$ C. and an ether solution of lithium aluminum hydride (410 milliliters of 0.76 molar solution) is added over a period of 12 minutes. The reaction mixture is carefully hydrolyzed with cold dilute hydrochloric acid and the ether layer washed repeatedly with saturated sodium bicarbonate solution and water. After drying over anhydrous sodium sulfate, the ether solution is evaporated, leaving a solid residue (57 grams) of 5-(p-methoxyphenyl)-3-methylpenta-2,4-dien-1-ol. [E(1%, 1 cm., cyclohexane) (368 mµ)=1402].

To a cold (−10° C.) solution of 5-(p-methoxyphenyl)-3-methylpenta-2,4-dien-1-ol (23 grams) in acetone (350 milliliters) is added with swirling and portionwise manganese dioxide (35 grams). The resulting slurry is allowed to stand at room temperature for 18 hours. The reaction mixture thus obtained is filtered and the filter cake washed thoroughly with anhydrous diethyl ether. The filtrate and ether washings are combined and the solvent evaporated under nitrogen, leaving a pale yellow solid (22.4 grams) [E(1%, 1 cm. cyclohexane) (346 mµ)=843]. Crystallization from methanol-Skellysolve F (200 milliliters, 1:1) at −20° C. give crystalline -5 - (p-methoxyphenyl)-3-methylpenta-2,4-dien-1-al (9.75 grams) [E(1%, 1 cm., cyclohexane (347 mµ)=1420].

To a cooled (5° C.) solution of dimethyl β-methyl glutacorate (8.3 grams, 0.48 mole) and 5-(p-methoxyphenyl)-3-methylpenta-2,4-dien-1-al (8.4 grams 0.0415 mole) in methanol (20 milliliters) is added a solution of potassium hydroxide (11.25 grams) in methanol (48 milliliters). The reaction mixture is allowed to stand at 20–25° C. for 22 hours. Additional (15 grams) potassium hydroxide in water (45 milliliters) is added and the resulting resolution is heated on a steam bath for ½ hour. After cooling to 20–25° C., more water (200 milliliters) is added. The diluted solution is then extracted with diethyl ether (two 300 milliliter portions). The clear, alkaline, water layer is then acidified with cold 20% hydrochloric acid. A yellow precipitate forms, which is collected by filtration, washed thoroughly with water and dried under vacuum. The product (14.6 grams) [E(1%, 1 cm., cyclohexane) (359.9 mµ)=975] consists essentially of the di-acid 4 carboxy-3,7-dimethyl-9-(p-methoxyphenyl)-nona-2,4,6,8-tetraenoic acid.

A portion (11.7 grams) of the di-acid is dissolved in 2,4-lutidine (125 milliliters) containing 0.5% copper acetate. The solution is heated to 110° C. for approximately 0.75 hour until evolution of carbon dioxide ceases. The reaction mixture is diluted with diethyl ether (700 milliliters) and washed repeatedly first with dilute sulfuric acid and finally with 0.5 N KOH and water to extract the acids. The combined alkaline extracts are acidified with 10% sulfuric acid solution and the acids extracted into diethyl ether. After washing the ether extract with water, drying over anhydrous sodium sulfate and evaporating the solvent, a yellow solid product (5.9 gram) [E(1%, 1 cm., cyclohexane) (368 mµ)=950] is obtained which consists essentially of 3,7-dimethyl-9-(p-methoxyphenyl)-nona-2,4,6,8-tetraenoic acid.

The yellow solid product is dissolved in 2-butanone (80 milliliters) and methyl iodide (30 milliliters) and the solution gently refluxed over anhydrous potassium carbonate (15 grams) for 2.5 hours after first standing overnight at 20–25° C. The reaction mixture is then diluted with ether, and washed repeatedly with water. After drying the ether layer over sodium sulfate, filtering, and evaporating the solvent, the residual oil is crystallized from methanol at −20° C., to give the crystalline methyl ester of 3,7-dimethyl-9-(p-methoxyphenyl)-nona-2,4,6,8-tetraenoic acid (2.0 grams) (M.P.=84–89° C.) [E(1%, 1 cm., cyclohexane) (380 mµ)=870[.

The crystalline ester (2.0 grams) is dissolved in dry ether (30 milliliters) and cooled to −5° C. An ether solution of lithium aluminum hydride (8.2 milliliters of 0.89 molar) is added with stirring over a period of five minutes. After three minutes additional stirring acetone is carefully added (dropwise) and then dilute hydrochloric acid is added. After washing the resulting ether solution successively with dilute acid, 0.5 N potassium hydroxide, and water, it is dried over sodium sulfate, filtered, and the solvent evaporated. The residual oil; (1.8 grams) [E(1%, 1 cm., cyclohexane) (335, 348, 366 mµ)=1145] is a concentrate consisting essentially of 3,7-dimethyl-9(p-methoxyphenyl)-nona-2,4,6,8-tetraene-1-ol.

To a solution of the tetraenol (1.0 gram) in methanol (3 milliliters) is added triphenylphosphine (1.0 gram). The mixture is cooled to 5° C. and a solution of alcoholic HCl (2.1 milliliters of 1.78 N) is added with stirring. After two hours of stirring, the reaction mixture is left overnight. It is then added simultaneously over a five minute period with a solution of potassium hydroxide (0.2 gram) in methanol (2 milliliters) to a stirred solution of retinal (1 gram) in methanol (3 milliliters) at −15° C. The reaction mixture is stirred at 0° C. for two hours, then at 20–25° C. for 3 hours. During this time maroon-colored solids are precipitated. The solids are filtered and washed with methanol, warm water, and again with methanol. After drying under vacuum, the solids (0.65 gram) [E(1%, 1 cm., cyclohexane) (444, 466, 497 mµ)=1940] are recrystallized from benzene-ethyl formate (1:1) to give a product (M.P. 188.5° C.) [E(1%, 1 cm., cyclohexane) (468 mµ)=2850] consisting essentially of 1-(2,6,6, - trimethylcyclohex - 1-enyl)-18 - (p-methoxyphenyl) - 3,7,12,16-tetramethyloctadec - 1,3,5,7,9,11,13,-15,17-nonaene.

Example 3

This example illustrates a specific embodiment of a process for the synthesis of 1,18-bis(p-methoxyphenyl)-3,7,12,16 - tetramethyloctadec - 1,3,5,7,9,11,13,15,17-nonaene.

To a quantity (1.8 grams) of 3,7-dimethyl-9-(p-methoxyphenyl)-nona-2,4,6,8-tetraene-1-ol, a synthesis of which is described in Example 2, dissolved in diethyl ether (130 milliliters) is added portionwise manganese dioxide (36 grams). The resulting slurry is gently swirled for 15 minutes, filtered, and the filter cake washed thoroughly with more ether. The combined filtrate and washings are evaporated to give a residual red oil. [Broad maximum at 390 mµ with [E(1%, 1 cm., cyclohexane)= 288]]. The oil is dissolved in benzene and chromatographed on a column of alumina (F–20 grade, 65 grams). The non-adsorbed fraction is combined with the ether eluate of the yellow-red zone at the bottom of the column, to give, after evaporation of solvent, a concentrate (0.35 gram) [E(1%, 1 cm., cyclohexane)(390 mµ)=1200] consisting essentially of 3,7-dimethyl-9-p-methoxyphenyl)-nona-2,4,6,8-tetraene-1-al.

To a quantity (0.4 gram) of 3,7-dimethyl-9-(p-methoxyphenyl)-nona-2,4,6,8-tetraen-1-ol, a synthesis of which is described in Example 2, dissolved in methanol is added triphenylphosphine (0.4 gram). The mixture is stirred (magnetic stirrer) during the slow addition of a methanolic solution of hydrochloric acid (0.9 milliliter of 1.7 N). After two hours a solution of 3,7-dimethyl-9-(p-methoxyphenyl)-nona-2,4,6,8-tetraen-1-al (0.35 gram) in methanol (8 milliliters) and a solution of alcoholic potassium hydroxide (0.8 milliliter of 2 N) are added simultaneously to the stirred solution. Stirring is continued for two more hours and the solids which have precipitated are then filtered and washed successively with methanol, water, and finally more methanol. After partial drying under vacuum, the solids (188 milligrams) [E(1%, 1 cm., cyclohexane) (472 mµ)=1330] are recrystallized from chloroform: acetone:methanol (0.5:0.5:5.0 milliliters) to give the desired product (60 milligrams) [E(1%, 1 cm., chloroform) (445, 474, 500 mµ)=2160]. It consists essentially of 1,18-bis(p-methoxyphenyl) - 3,7,12,16 - tetramethyloctadec - 1,3,5,7,9,11,13, 15,17-nonaene.

A sample of the carotenoid compound of Example 1 was actually fed for seven days to 3 week old Hallcross White Leghorn cockerels which had been kept on a pigment-low diet from birth and which were depleted of skin pigments at the time the carotenoid compound was introduced into the diet. At the end of seven days, the shank skin pigmentation, was assessed visually by a panel of four people. The panel found that the shank skin had color and that it was yellow.

The compounds of Examples 2 and 3 under similar conditions resulted in poultry shank skin acquiring a pink color which currently is not desirable. On the other hand the compounds of Examples 2 and 3 as well as the compound of Example 1 have utility as food colorants.

Other features, advantages and specific embodiments of this invention will be apparent to those in the exercise of ordinary skill in the art after reading the foregoing disclosures. In this regard while specific embodiments of processes for the synthesis of compounds of this invention have been described in considerable detail, variations and modifications of these embodiments can be effected without departing from the spirit and scope of the invention as disclosed and claimed.

We claim:
1. A carotenoid compound selected from the group consisting of 1-(2,6,6-trimethylcyclohex-1-enyl)-18-(p-methoxyphenyl) - 3,7,12,16 - tetramethyloctadec - 1,3,5,7,9,11,13,15,17-nonaene and 1,18-bis(p-methoxyphenyl)-3,7,12,16 - tetramethyloctadec - 1,3,5,7,9,11,13,15,17 - nonaene.

2. 1 - (2,6,6-trimethylcyclohex-1-enyl) - 18 - (p-methoxyphenyl) - 3,7,12,16 - tetramethyloctadec - 1,3,5,7,9,11,13,15,17-nonaene.

3. 1,18 - bis(p - methoxyphenyl) - 3,7,12,16 - tetramethyloctadec-1,3,5,7,9,11,13,15,17-nonaene.

References Cited

UNITED STATES PATENTS

| | | | |
|---|---|---|---|
| 2,849,495 | 8/1958 | Isler et al. | 260—666 XR |
| 2,871,267 | 1/1959 | Petracek et al. | 260—611 XR |
| 3,033,897 | 5/1962 | Robeson | 260—611 XR |

BERNARD HELFIN, *Primary Examiner.*